INVENTORS
ORVILLE B. SHAFER
GUSTAV V. A. MALMROS
BY Ralph R Barnard
ATTORNEY

June 28, 1966 O. B. SHAFER ETAL 3,258,751

CHARACTER IDENTIFICATION TECHNIQUE

Filed Dec. 24, 1962 5 Sheets-Sheet 2

CHARACTER IDENTIFICATION TECHNIQUE

Filed Dec. 24, 1962 5 Sheets-Sheet 5

United States Patent Office 3,258,751
Patented June 28, 1966

3,258,751
CHARACTER IDENTIFICATION TECHNIQUE

Orville B. Shafer, Owego, and Gustav V. A. Malmros, Binghamton, N.Y., assignors to International Business Machines Corporation, New York, N.Y., a corporation of New York Filed Dec. 24, 1962, Ser. No. 246,793
6 Claims. (Cl. 340—146.3)

This invention relates generally to a character sensing and identification technique and more particularly to a new and improved character sensing and identification technique utilizing combinations of standard shape identifying elements wherein the sequence in which the shape identifying elements are detected is a determining factor in identifying the character.

In the electronic data processing field there has arisen a substantial requirement for reading records at electronic speeds. These records may consist of symbols or characters which have been either printed or writen by hand. Much has been written in this technical area and a number of operating systems are available in the market for accomplishing this task. For printed or handwritten symbols and characters the trend has been for the use of character sensing and identification systems with especially prepared, well registered, stylized or single font. This means that the prior art character sensing or identification systems require a specially prepared input document, specific paper stock, ink, and type face, etc. While many workable systems and techniques are available for operation in accordance with these boundary conditions it is a very tough problem to induce industry and commerce to accept the requirements of utilizing these standard materials and type fonts. As a practical matter, very limited equipment is available on the market which will handle handwritten words.

There have been two general methods which have been utilized for the recognition of a letter or numeral. One is known as the mask method which employs either positive or negative masks to determine if a character is in fit. This method can be employed either optically or electronically and has the disadvantages that it is relatively slow in decoding data and requires a considerable amount of equipment.

Still other general techniques are known as the shape methods. Using one shape method the characters (numerals and letters) can be divided or separated into combinations of elemental shapes such as vertical lines, horizontal lines and open or closed loops, etc. Still other systems are utilized which use a combination of the mask and shape methods briefly described. Most shape methods require a substantial number of shape identifying elements to identify characters without ambiguity. Of course, the number of shape identifying elements can be reduced by placing limitations on the variations of fonts with which the character identification system is required to operate.

It is the combination of shape identifying elements method with which the teachings of the present invention is concerned. The combination of shape methods presently known have had a practical limitation in that a large amount of equipment is required to recognize the large number of shapes which are used to overcome ambiguities in a system embodiment which is operating with characters over a range of fonts and without other constraints. For example, one known combination shape method is designed to separate numbers into nine shape identifying elements. These are all straight lines designated according to their physical location in the field of view of the character to be identified as $LV_L$ (Long Vertical on the Left), $LV_R$ (Long Vertical on the Right), $H_T$ (Horizontal on the Top), $V_{UL}$ (Vertical Upper Left), $V_{LL}$ (Vertical Lower Left), $V_{UR}$ (Vertical Upper Right), $V_{LR}$ (Vertical Lower Right), $H_M$ (Horizontal in the Middle), $H_B$ (Horizontal on the Bottom). Under this system, a numeral 1 placed in the field of view for analysis would indicate that the numeral 1 was identified by the elements, $L_{VL}$, $V_{UL}$ and $V_{LL}$. Similarly, a numeral 2 was identified by the elements $H_T$, $H_M$, $H_B$, $V_{LL}$, $V_{UR}$. The other numerals could be analyzed and identified on the same basis. In this prior art shape method, the sequence of the detection of the shape identifying elements was not deemed significant and nine elements are required to identify a relatively stylized font. Had handwritten numerals or letters of the alphabet been analyzed, these nine shape identifying elements may not have been sufficient to have identified the character. Of course, under very optimum stylized font and operating conditions, the nine shapes or elements might have been reduced. In summary, the combination of shape identifying elements method is subject to limitations which would be desirable to avoid.

It is, therefore, a primary object of the present invention to provide a new and improved character sensing and identification technique which uses a combination of shape identifying elements method wherein the sequence in which the elements are detected is a determining factor in identifying the character.

It is another object of the present invention to provide a new and improved character sensing and identification technique which is capable of operation with a maximum variation of font including handwritten characters.

It is still another object of the present invention to provide a new and improved character sensing and identification technique which uses a sequential combination of shape identifying elements method in a manner such that a minimum amount of equipment is required.

It is an additional object of the present invention to provide a new and improved character sensing and identification technique which utilizes a sequential combination of shape identifying elements method requiring a minimum number of characteristic shape identifying elements.

The objects of the present invention are provided by a new and improved character sensing and identification technique including scanning a field of view containing a character to be identified in a raster like manner and sampling at a given repetition rate to determine when the raster is passing over the character in terms of a sequence of plural shape identifying elements as defined by sequential combinations of positive samples derived from the raster scan.

The foregoing and other objects, features and advantages of the invention will be apparent from the following more particular description of a preferred embodiment of the invention as illustrated in the accompanying drawings.

In the drawings:

FIGURE 1 shows an electrical block diagram of an operating embodiment of the teachings of the present invention not including sequence registers of diode decoding matrices;

FIGURES 2*a* and 2*b* show electrical block diagrams of sequential shifting registers and diode decoding matrices which may be used with the system of FIGURE 1 in accordance with the teachings of the present invention;

Characters or symbols used to represent either numerals or alphabetic characters, etc., may be generated by a sequence of strokes of a writing instrument wherein each stroke has a particular identifying shape or orientation. Recognizing that these shape identifying elements were used in the prior art to develop character sensing and identification systems through the use of varying combinations thereof, it is the underlying theory of the present invention that the sequence with which these shape identifying elements are detected could be of material value in identifying a character being analyzed.

For example, when using combinations of shape identifying elements according to the prior art, it should be clear that a system utilizing nine different elements might, in the extreme case, have a requirement for including storage data handling and diode matrix decoding equipment for $2^9$ combinations. On the other hand, by utilizing combinations of shape identifying elements in which the sequence of the detection of the shape identifying elements has significance in identifying the character, the amount of equipment required is substantially reduced. The relative circuit simplicity of a character sensing and identification system built according to the teachings of the present invention will be made clear as the description proceeds.

Figure 3:
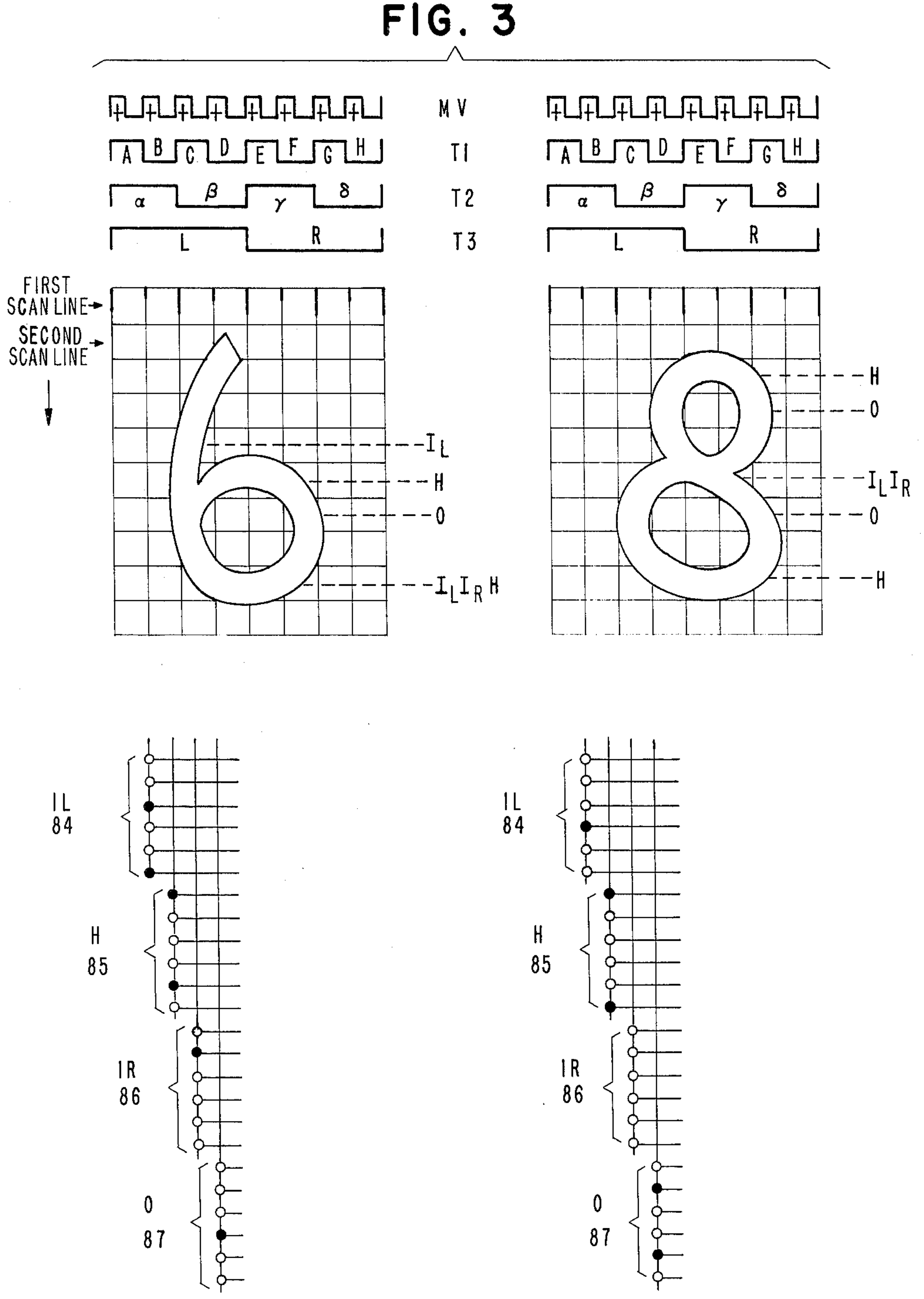
FIGURE 3 shows two characters 6 and 8 placed in a field of view of a raster like scan sensing operation for analysis in accordance with the teachings of the present invention.

For a simplified description of the teachings of the present invention, consider passing a pencil across the field of view of the numeral 6 shown at the left in FIGURE 3 in the manner of a raster scan starting in the upper left-hand corner of the field of view. Consider also that as the pencil proceeds from left to right on each level that you are sampling (bring the pencil down on the surface of the field of view) at a known repetition rate to determine whether or not the pencil is passing over a portion of the numeral. Then, as the pencil proceeds through the raster like scanning operation, the sampling decisions are weighed according to rules described hereinafter for defining four distinct shape identification elements. Referring to the field of view of numeral 6 on the left-hand side of FIGURE 3, consider that the sampling of the pencil occurs at positions along each scanning line identified by the positive pulses labeled MV. Also, each horizontal scanning line is divided for purposes of analysis into subsectors represented by A, B, C, D, E, F, G, H, labeled T1. These subsectors are part of sectors alpha ($\alpha$), beta ($\beta$), gamma ($\gamma$) and delta ($\delta$), represented by T2. Finally, note that each scanning line is divided into two halves identified as L and R, labeled T3. Thus, the instantaneous position of the raster sampling pencil along each horizontal scanning line can be located in terms of these subdivisions which are conveniently related to each other by a factor of two. The four shape exemplary identifying elements may be the following:

SHAPE IDENTIFYING ELEMENT $I_L$ which represents a vertical line in the left portion of the field of view (portion L or any subdivision thereof) such as that of the left portion of a 0 or 5. The numeral 1 is also seen in the left portion of the field of view. As the sampling proceeds in the raster like scan of the pencil, a positive sampling is obtained when the pencil is over a portion of the character. If either on four consecutive scan lines a positive sample is obtained in sector alpha or on four consecutive scan lines a positive sample is obtained in sector beta, it may be said that the shape identifying element $I_L$ has been generated.

SHAPE IDENTIFYING ELEMENT H represents a horizontal line anywhere in a character in the field of view such as the top and bottom of a 0, the cross bar of a 4, or the top and bottom of a 2. Shape identifying element H is sensed by the sampling pencil obtaining a positive sample (landing on the body of a character to be identified) on four consecutive samples (multivibrator pulses MV) in any scan line. Note that a shape identifying element H can be generated in the process of generating a shape identifying element $I_L$ since the latter requires at least four lines of the raster like pencil scan.

SHAPE IDENTIFYING ELEMENT O represents a gap between two portions of a numeral such as in a 4, in a 0, or in a 6, etc. Shape identifying element O is sensed by the sampling pencil during any single raster like scan line obtaining a positive sample (being over the body of a numeral) on one sampling followed by one or more negative samples (not being over the body of the numeral) and then followed by a positive sample.

SHAPE IDENTIFYING ELEMENT $I_R$ represents a vertical line in the right-hand portion of the field of view labeled R and would be present in numerals such as in the right of a 0, or a 5, or a 4. Shape identifying element $I_R$ is sensed by the sampling pencil receiving a positive sampling (being over the body of a numeral) on either four consecutive raster scan lines in the section gamma or four consecutive raster scan lines of sector delta, as shown. Note that at least four lines of a raster like pencil scan is required before shape identifying element $I_R$ may be sensed. Meanwhile, any of the other elements may be completely sensed. (For example, elements H and O may be fully sensed during any one line of the raster scan.)

In summary, as the sampling pencil is caused to scan the character to be identified in a raster like manner, the location of the sample in a given line of raster scan is significant in the identification process. In addition, since each of the shape identifying elements requires the counting of the positive samples from the sampling pencil (wherein the pencil came down on the body of a character), there is a requirement for means for counting and storing while in the process of sensing any of the shape identifying elements.

Specfically, by way of example, the sensing of shape identifying element $I_L$ might be thought of as requiring two buckets wherein marbles may be placed therein as the sampling raster passes through section alpha or beta during each scanning line. One bucket would be for sector alpha ($\alpha$) and the other bucket would be for section beta ($\beta$). Any time the sampling pencil passes over either the $\alpha$ sector or the $\beta$ sector during a single line and it does not receive a positive sample (fall on the body of a numeral), the contents of that bucket is emptied in a manner indicating the shape identifying element $I_L$ is not being sensed. However, if on four consecutive lines of the raster like pencil scan either the $\alpha$ bucket or the $\beta$ bucket is filled by reason of there being a positive sample with respect to either during the four successive raster scans that $\alpha$ or $\beta$ bucket is emptied indicating that a shape identifying element $I_L$ had been sensed.

As in the case of $I_L$, shape identifying element $I_R$ would also require a gamma ($\gamma$) and a delta ($\delta$) bucket wherein marbles may be placed as the sampling pencil proceeds on the raster scan. The buckets may be filled and emptied in exactly the same manner as in sensing $I_L$ except the sampling of significance is that in sectors $\gamma$ and $\delta$.

With respect to shape identifying element H, only one bucket is required and a marble is placed therein each time a sample indicates that the raster pencil is on top of the body of a character. However, if the pencil does not land on a character on four consecutive samples, the bucket is emptied indicating that the shape identifying element H has not been generated. However, if the bucket for shape identifying element H contains four marbles, it is emptied in a manner indicating that the shape identifying element H has been sensed.

In any event, the bucket is emptied each time the raster pencil reaches the end of a scan line.

Another bucket could be labeled O in which a marble is placed during the first sample time on any scan line when a positive sample is made. If on any succeeding sample a negative sample is obtained, the bucket is prepared for emptying. Then, if on a succeeding sample in the same scan line of the pencil a positive sample is obtained, the bucket labeled O is emptied in a manner indicating that the shape identifying element O has been sensed. In any event, the bucket labeled O is emptied at the end of each scan line to prepare for the next scan line.

The sequence with which the buckets H, O, $I_L$ and $I_R$ are emptied in a manner indicating that the corresponding shape identifying element is sensed is determinative of the character being identified.

For some characters, some shape identifying elements will not be sensed, and for some characters, some shape identifying elements will be sensed twice. However, in practicing the teachings of the present invention, the same shape identifying elements should never be indicated as being sensed until a different shape identifying element has preceded it.

By tabulating the identity and sequence in which the buckets have been emptied (in a manner indicating that the corresponding shape identifying element is sensed), the person utilizing the pencil to sample a field of view can identify the character by making reference to a chart such as the following:

0=H O $I_L$ $I_R$ H
1=$I_L$
2=H $I_R$ H
3=H $I_R$ H $I_R$ H
4=O $I_R$ H $I_R$
4=O $I_R$ $I_L$ H $I_R$
5=H $I_L$ H $I_R$ H
6=$I_L$ H O $I_L$ $I_R$ H
6=H $I_L$ H O $I_L$ $I_R$ H
7=H $I_R$
7=H O $I_R$
8=H O $I_L$ H O H
8=H O $I_L$ $I_R$ O H
9=H O H $I_R$ H
9=H O H $I_R$

The purpose of describing the teachings of the present invention in terms of scanning a field of view in a raster like manner with a pencil utilizing the placing of marbles in buckets characterizing a particular shape identifying elements to indicate the content of the sample when the pencil point is placed on the body of the character to be identified was to illustrate the invention in its most fundamental form. The simplicity of the operation is indicative of the broad teachings of the present invention and the fact that the present invention can be utilized to minimize the equipment required to sense and identify characters.

An electrical digital type system utilizing the teachings of the present invention is described in FIGURES 1–6. Instead of utilizing a pencil to provide a raster like horizontal scan of a field of view 10, a flying spot scanner circuit is shown which includes cathode ray tube 11. The flying spot scanner moves a source of light (a raster) over the field of view via lens 12. When the spot crosses the body of a character being identified, photocell 13 picks up an electrical indication of the same. In response thereto, a conventional pulse generator 14 generates a positive voltage pulse. The conventional pulse generator 14 may include an inverter and an amplifier. Many variations may be made on the optical to electrical scanning arrangements shown within the teachings of the present invention. For example, an image dissector type scanner may be used.

Figure 1:
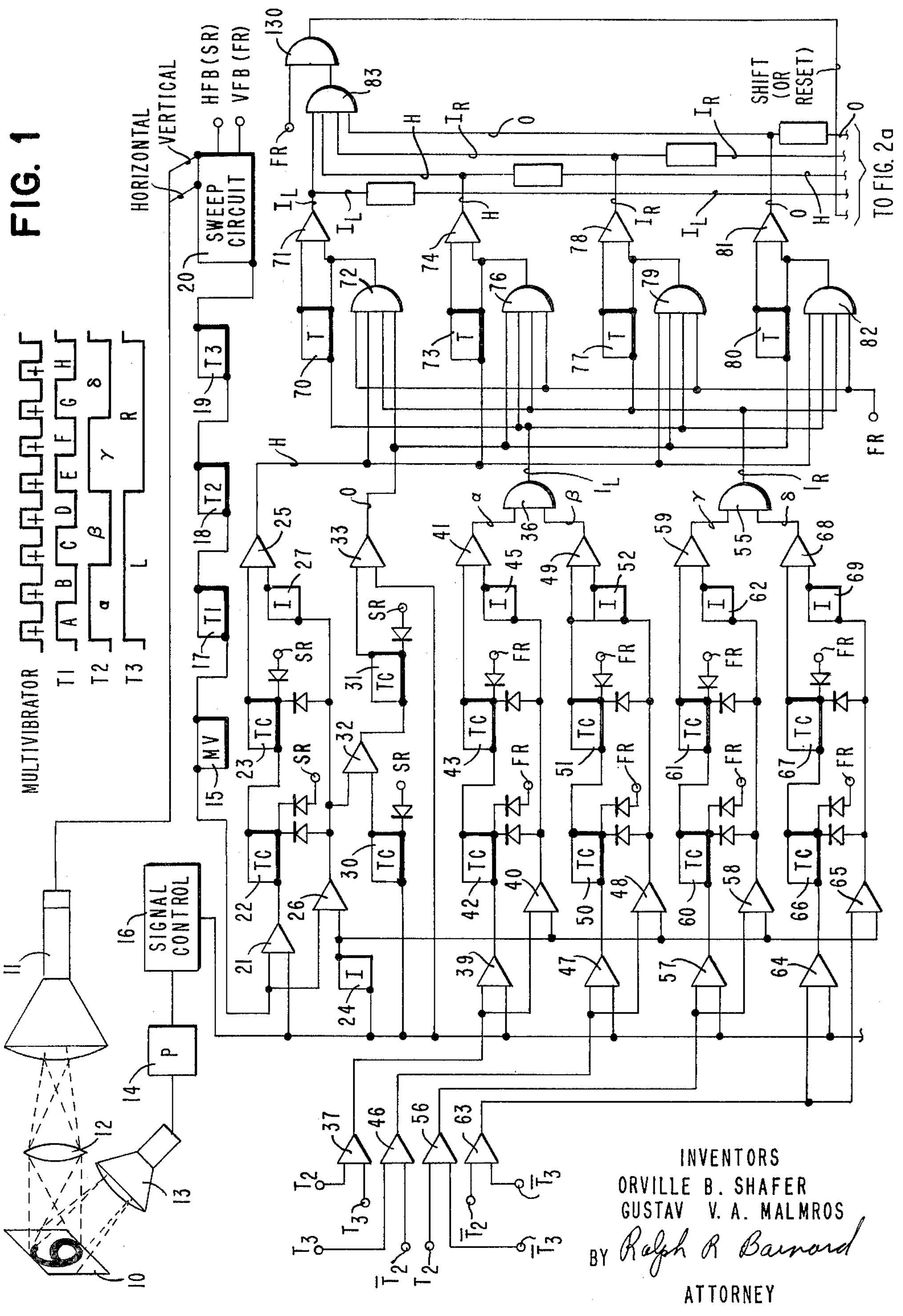

As in the above simplified description with respect to the sampling rate of the pencil, the sampling rate of the system of FIGURE 1 along each scanning line is shown as the output of a multivibrator 15. Moreover, as before, each scanning line over the field of view is further divided into subsectors A, B, C, D, E, F, G, and H, sectors $\alpha$ $\beta$, $\gamma$, $\delta$, and portions L and R. As before, these parts of a scanning line bear a frequency relationship of two to one to one another and are important in identifying the characters in terms of both the sequence of generation and combination of shape identifying elements. Electronically, the division of each scan line may be accomplished by the use of three "division by two" counter stages 17, 18 and 19. As shown, each counter stage comprises a conventional trigger. When a scan line of the raster is completed, conventional sweep circuit control means 20 initiates the next scan line at a lower level in the field of view. Accordingly, the multivibrator and counter stages provide electrical information as to the sampling of the electrical raster scan and the division of the raster scan line for use in the detection of shape identifying element outputs H O $I_L$ and $I_R$ in accordance with the teachings of the present invention. Instead of employing marbles and buckets as described hereinabove, electronic digital logic circuits are utilized as shown.

For example, AND circuits 21, 25 and 26, trigger circuits 22 and 23 and inverter 27, along with the diodes (oriented as shown) are utilized in the circuit shown to identify the generation of a shape identifying element H as the raster scan of the flying spot moves across the field of view during any one scan line.

Similarly, triggers 30 and 31 along with AND circuits 26, 32, 33 cooperate to generate an output voltage pulse when the flying spot scanner passes over a portion of a character in the field of view which may be identified as the shape identifying element O.

As suggested hereinabove, the generation of a shape identifying element $I_L$ can be on the basis of the content of the field of view in either sector $\alpha$ or sector $\beta$. Therefore, the logic circuit means for generating that character may be considered in two parts which are common in an OR circuit 36. As shown herein, the $\alpha$ sector and the logic identifying circuit means is made up of AND circuits 37, 39, 40 and 41, triggers 42 and 43 and inverter circuit 45. Also included are plural diodes connected and oriented as shown providing a steering and decoupling function. Similarly, the logic identifying circuit means associated with sector $\beta$ included AND circuits 46, 47, 48 and 49, trigger circuits 50 and 51, and inverter 52. Also included are plural diodes oriented and connected as shown providing a steering and isolation function.

Similarly, shape identifying element $I_R$ can be generated by the flying spot scanner scanning a character in either sector $\gamma$ or sector $\delta$. FIGURE 1 shows two separate logic identifying circuits providing inputs to OR circuit 55. Specifically, the logic identifying circuit means associated with sector $\gamma$ includes AND circuits 56, 57, 58 and 59, triggers 60 and 61 and inverter 62 connected as shown. Also included are two diodes oriented and connected as shown. Similarly, with respect to sector $\gamma$, the logic identifying circuit means may include AND circuits 63, 64, 65 and 68, triggers 66 and 67 and inverter 69 connected as shown. Also included are two diodes oriented and connected as shown.

As shown above, it is possible to generate two shape identifying elements $I_L$ and $I_R$, each being representative of vertical line segments in the character to be identified. Thus it is possible to generate shape identifying elements representative of preceding and succeeding vertical lines, $I_L$ preceding $I_R$ and $I_R$ succeeding $I_L$.

Inverter 24, as shown, is operative in electrical common with all four electronic logic circuits for H, O, $I_L$ and $I_R$ and has the purpose of supplying a positive pulse whenever pulse generator 14 indicates a negative sample or no signal.

Figure 6A:
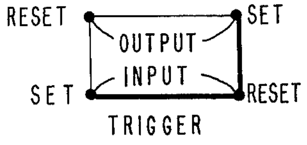
FIGURES 6*a*, 6*b*, 6*c* and 6*d* show the logic blocks which are utilized in the electrical block diagrams of FIGURES 1, 2, 4 and 5.

FIGURE 6*a* shows a suitable trigger which is used in

Figure 4:
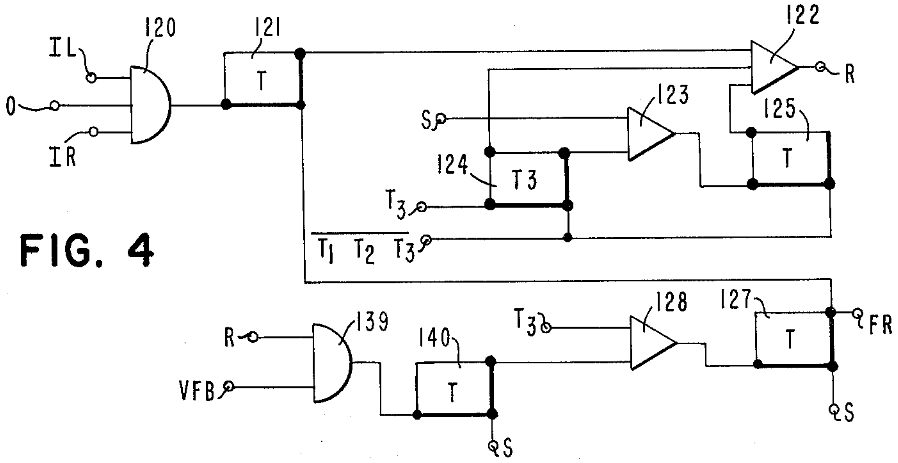
FIGURE 4 is an electrical block diagram of readout circuitry which may be used to sense the plural outputs from the decoding matrices of FIGURES 2*a* and 2*b* in accordance with the teachings of the present invention.
Figure 5:
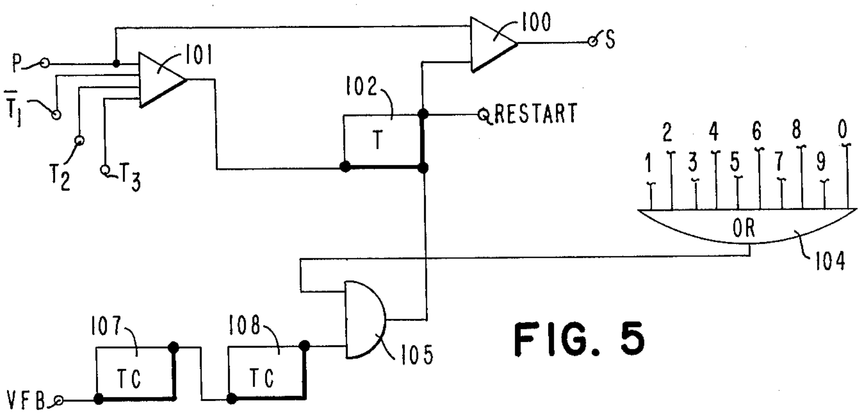
FIGURE 5 is an electrical block diagram of a signal control system which may be utilized as the signal control circuit shown in block form in FIGURE 1.
Figure 6B:
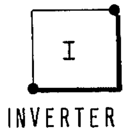
Figure 6C:
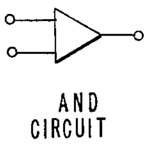
Figure 6D:
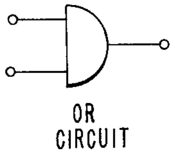

FIGURES 1–4 and 5 as both a trigger stage and a switch register stage. As shown, the two lower terminals are set and reset input terminals and the two upper terminals are the set and reset output terminals. When the trigger is in a set condition, as a result of a positive voltage being applied to the set input terminal, the set output terminal is at its high voltage level and the reset output terminal is at its low voltage level. When the trigger is placed in a reset condition as a result of a positive voltage being applied to the reset input terminal, the voltage levels at the set and reset output terminals are interchanged. FIGURE 6*b* shows a conventional inverter used in the present description wherein the input terminal is in the lower left-hand corner and the upper terminal is in the upper right-hand corner providing an inversion of the electrical signal between the input and output terminals. FIGURES 6*c* and 6*d* show the symbology used for conventional AND and OR circuits which are used in the above-identified electrical block diagrams. As is conventional, the AND circuit requires two high voltage level inputs to obtain a high voltage output while the OR circuit requires that only one of the inputs be at an up voltage level in order for the output to be at a high voltage level.

Assuming that signal control circuit 16 is operative to connect the output of photo tube 13 to the analysis circuit, the shape identifying element logic generating circuitry of FIGURE 1 will be operative in accordance with the following description.

With respect to shape identifying element H, AND circuits 21 and 26 receive a sampling gating pulse from the multivibrator 15 each time a pulse could be generated by pulse generator 14 in accordance with the sampling rate of the raster in the field of view. If the sampling is positive, AND circuit 21 passes a pulse to the first stage 22 of the counter. If for four successive samples, as timed by the output of multivibrator 15, a positive sample is indicated by pulse appearing in the output of pulse amplifier 14, the two stage counter formed by triggers 22 and 23 will provide an output via AND circuit 25 indicative of a shape identifying element H being generated. On the other hand, if during any one of these samples, a pulse indicating a positive sampling is not generated by amplifier 14, AND circuit 26 receives an input via inverter 24 at the gating time provided by multivibrator 15 which is effective to reset either or both triggers 22 and 23 via two diodes shown. At the end of each scan line, the conventional sweep circuit 20 generates a horizontal fly back signal which may be used as a scan line reset signal SR for resetting both of triggers 22 and 23.

In the generation of shape identifying element O there is a requirement of having one positive sample followed by one or more negative samples followed by a positive sample, all within one scan line of the raster. The voltage pulse associated with the positive sample will set trigger 30 and also provide an input to AND circuit 32. Assuming that the next sample was negative and no pulse was generated in the output of amplifier 14, inverter 24 and AND circuit 26 will provide the second input pulse to AND circuit 32 and trigger 31 is placed in its set condition. Then, if on a following sample on the same scan line a sampling is positive, so that a pulse is generated in the output of amplifier 14, AND circuit 33 is set up to generate an output pulse which is indicative of the sensing of a shape identifying element O. If on the other hand, during any scan line both of triggers 30 and 31 are not driven to a set condition and the output AND circuit 33 is energized to indicate the sensing of two positive samples separated by one or more negative samples (representative of the shape identifying element O), an SR resetting pulse applied to triggers 30 and 31 at the end of the scan line will prepare the analysis circuit for the next scan line. As described hereinabove, the SR resetting pulse is generated in a conventional manner from horizontal sweep circuit means 20.

With respect to shape identifying elements $I_L$ and $I_R$, it will be recalled that an appropriate output signal is produced when a positive sample is obtained while the sensing raster passes through a sector such as either $\alpha$ or $\beta$, or $\gamma$, or $\delta$, respectively, during four successive horizontal raster scans. Sector $\alpha$ is related to the sensing of one shape identifying element $I_L$, sector $\beta$ is related to the distinctive sensing of a shape identifying element $I_L$, sector $\gamma$ is related to the sensing of one shape identifying $I_R$ and sector $\delta$ is related to the distinctive sensing of a shape identifying element $I_R$.

In analyzing the trigger waveforms of the counter stages 17, 18 and 19 as shown, it will be noted that when T2 and T3 are providing an up level, sector $\alpha$ is being scanned; when the output of T2 is at a down level and T3 is at an up level, sector $\beta$ is being scanned; when T2 is at an up level and T3 is at a down level, sector $\gamma$ is being scanned; and finally, when both T2 and T3 are at a down level, sector $\delta$ is being scanned. AND circuit 37 will have an output when sector $\alpha$ is being scanned; AND circuit 46 will have an output when sector $\beta$ is being scanned; AND circuit 56 will have an output when sector $\gamma$ is being scanned; and, AND circuit 63 will have an output when sector $\delta$ is being scanned.

Accordingly, AND circuits 39 and 40 are gated to pass a voltage pulse indicative of a positive sample during the time the scanning spot moves through sector $\alpha$; AND circuits 47 and 48 are gated to pass a voltage pulse indicative of a positive sample during the time the scanning spot moves through sector $\beta$; AND circuits 57 and 58 are gated to pass a voltage pulse indicative of a positive sample during the time the scanning spot moves through sector $\gamma$; and, AND circuits 64 and 65 are gated to pass a voltage pulse indicative of a positive sample during the time the scanning spot moves through sector $\delta$. Each of these pairs of AND circuits provides input to a "count of four" counter which will reset, if any one of the series of four possible pulses are not present. Specifically, AND circuit 39 will provide a voltage pulse to the counter comprising triggers 42 and 43 if a positive sample is obtained by the scanning spot in sector $\alpha$ of any one scan line. If on four successive scan lines, a positive sample is obtained in sector $\alpha$, OR circuit 36 is energized indicating the sensing of a shape element $I_L$. On the other hand, if during any one of four successive scan lines a negative sample is obtained, AND circuit 40 will provide a voltage pulse to both counter stages via diodes to reset the counter. Note that AND circuit 40 is connected to the pulse generator 14 via inverter 24.

Counter triggers 50 and 51 operate in the same manner with respect to sector $\beta$; counter triggers 60 and 61 operate in the same manner with respect to sector $\gamma$; and counter triggers 66 and 67 operate in the same manner with respect to sector $\delta$. Thus, OR circuits 36 and 55 have outputs commensurate with the generation of the shape identifying elements as indicated.

Triggers T2 and T3 provide inputs to AND circuits 37, 46, 56 and 63, and are the same triggers shown as counter triggers 18 and 19, respectively. The reset terminals SR and FR of FIGURE 1 are for the purpose of applying to the counters shown a reset signal SR at the end of each scan line and a reset signal FR at the end of each complete raster scan of a field of view. The reset signal SR may be derived in a conventional manner from sweep circuit 20 at horizontal fly back times (HFB) and the reset signal FR may be derived as described hereinafter with respect to FIGURE 4, or from the sweep circuit 20 in a conventional manner at vertical fly back time (VFB).

Inasmuch as it is desirable in practicing the teachings of the present invention that a shape identifying element output signal should not be sensed in a successively repetitive manner, means must be provided for disabling the output of each of the aforementioned AND circuits 25 and 33 and OR circuits 36 and 55 whenever a pulse appears thereon in response to the sensing of either of the shape identifying signals H, O, $I_L$ or $I_R$, respectively, until another type of shape identifying element is sensed. To provide for such operation, each of the output signals are sent to a specialized gating circuitry comprising a trigger, an AND circuit and an OR circuit. The number of triggers, the number of OR circuits, and the number of AND circuits are thus equal, individually, to the number of outputs representing a shape identifying element. Thus, if there were N shape identifying elements, there would be N triggers, N AND circuits, and N OR circuits. For example, a shape identifying element output signal $I_L$ is passed through a trigger 70 and an AND circuit 71. Thus, a voltage pulse indicating that a shape identifying element $I_L$ has been detected will set trigger 70. AND circuit 71 prevents passage of this pulse until some other shape identifying element output signal is received which gates the AND circuit 71 via OR circuit 72 and resets trigger 70 (via its reset output) in readiness for another $I_L$ signal. It should be noted that OR circuit 72 is connected to receive an input when a shape identifying element H, O or $I_R$ is generated.

The line associated with shape identifying element H is connected to a trigger 73, an AND circuit 74, and an OR circuit 76 functioning therewith in the same manner. The line associated with shape identifying element $I_R$ has a trigger 77, an AND circuit 78 and an OR circuit 79 associated therewith functioning in the same manner. Finally, the line associated with shape identifying element O has associated therewith trigger 80, AND circuit 81 and OR circuit 82 connected and functioning in the same manner. Similarly, the OR circuit 76 is connected to receive an input when a shape identifying element O, $I_L$ or $I_R$ is generated; the OR circuit 79 is connected to receive an input when a shape identifying element H, O or $I_L$ is generated; and, the OR circuit 82 is connected to receive an input when a shape identifying element H, $I_L$ or $I_R$ is generated.

With respect to the last identifying element output signal obtained in a raster scan, that signal is gated through an AND circuit (71, 74, 78 or 81), and the trigger associated with that signal is reset by a reset pulse FR.

Figure 2A:
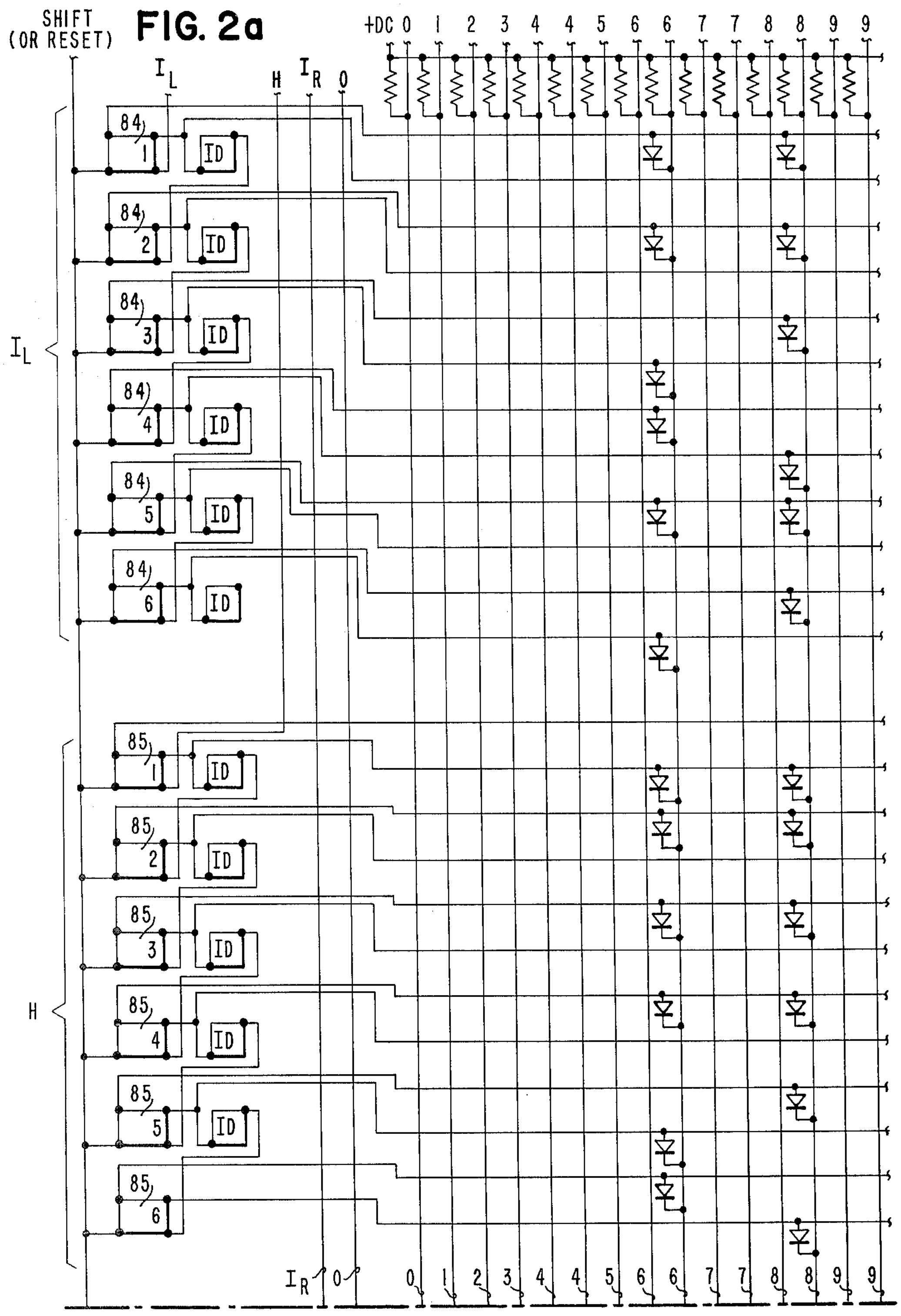
Figure 2B:
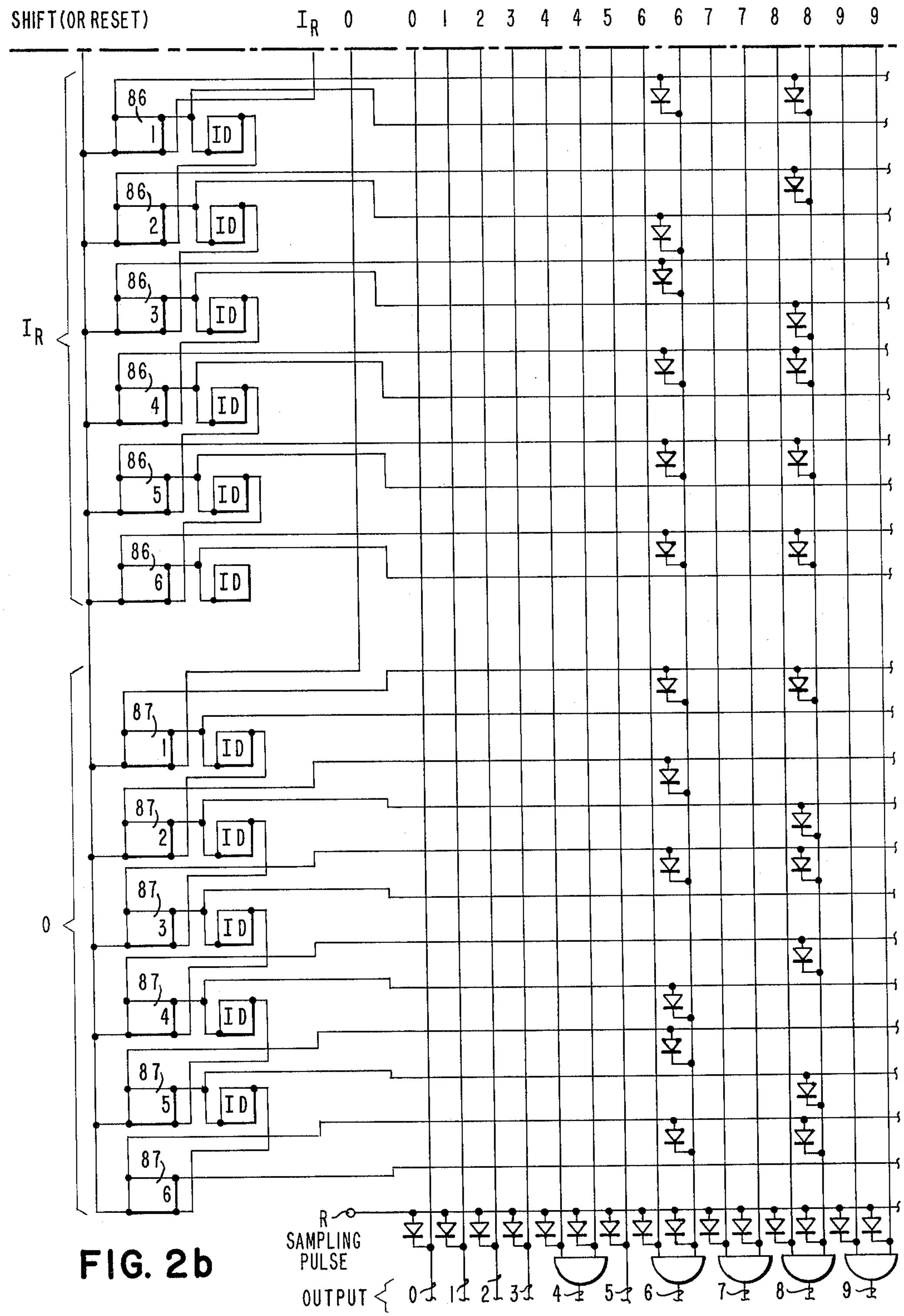

As will be recalled from the simplified explanation of the invention set forth hereinabove, it is important not only to identify the shape identifying elements which are being generated through the course of a raster like scan of the entire character in a field of view, but it is also important to know in which sequence these shape identifying elements were generated. For this purpose, the lines associated with each of the shape identifying elements are connected to provide input pulses to shift registers. These shift registers are shown in FIGURES 2*a* and 2*b*. As shown, line $I_L$ is shown connected to a shift register comprising six stages of triggers 84. The line associated with shape identifying element H is connected to provide an input to a shift register having six stages made up of triggers 85. The line associated with shape identifying element $I_R$ is shown connected to provide an input to shift register made up of six stages of triggers 86. The line associated with shape identifying element O is connected to provide an input to a six stage shift register made up of triggers 87.

The conductor labeled shift (reset) is shown in FIGURES 2*a* and 2*b* connected in common with the reset input of all the triggers in each of the shift registers. On inspection of FIGURE 1, it will be noted that a shifting pulse is generated in the output of OR circuit 130 each time an output pulse is generated representing any one of the shape identifying elements $I_L$, H, $I_R$ and O or by the vertical sweep signal FR which occurs at the time the raster completes a scan of the field of view.

Accordingly, after the flying spot scanner has completed a raster like scan of the field of view 10, the content of the plural shift register will be both representative of the shape identifying elements which were generated during the course of the raster scan of the field of view and also of the sequence of the generation. Referring to FIGURE 3, there is shown a particular form of a numeral 6 and a numeral 8 each in a field of view for analysis in accordance with the teachings of the present invention. Also shown beneath each of the numerals are the plural stages of the plural shift registers of FIGURES 2*a* and 2*b*, each stage represented by a circle. The circles are darkened when that stage is in a set condition representing the detection (or generation) of a particular shape identifying element. The content of the shift registers is intended to depict the type of shape identifying elements generated and the sequence in which they were generated.

As those skilled in the art know, each character sensing and recognition application would have to be analyzed to determine which sequential combinations of selected shape identifying elements could be utilized to identify particular characters. Different variations of the same character would, of course, result in different sequential combinations of selected shape identifying elements. The table set forth hereinabove is indicative of one simplified analysis.

Moreover, FIGURE 3 shows a detailed variation of the analysis of one form of the numeral 6 and numeral 8 from the table set forth hereinabove. The diode matrix of FIGURES 2*a* and 2*b* is constructed with reference to the analysis of the particular forms of numerals 6 and 8 shown in FIGURE 3. For example, the AND circuit associated with the numeral 6, shown, has diodes connected to the set output side of the stages (see FIGURE 6*a*) of each sequence shift registers 84, 85 and 87 which is shown in FIGURE 3 to contain a stored quantity representing a shape identifying element. In addition, the AND circuit for the numeral 6 also has a diode connected to the reset output terminal of each stage of each of the sequence shift registers 84, 85 and 86 in which there is no stored quantity representative of a shape identifying element as shown by the blank circle of FIGURE 3.

Specifically, in FIGURE 3, the analysis of the numeral 6 shown in the field of view resulted in the detection of a sequence of shape identifying elements of $I_L$, H, O, $I_L$, $I_R$, H. Therefore, as shown, the third and sixth stage of the shift register 84 has a stored quantity therein; the first and fifth stage of the shift register 85 associated with shape element H has a stored quantity therein; the second stage of the shift register 86 associated with shape identifying element $I_R$ has a stored quantity therein; and finally, the fourth stage of shift register 87 associated with shape identifying element O has a stored quantity therein. Therefore, in the diode matrix of FIGURES 2*a* and 2*b* a diode is connected to each of the set output terminals of the third and sixth stages of shift register 84, the first and fifth stages of shift register 85, the second stage of shift register 84, and the fourth stage of shift register 87. At the same time, the AND circuit associated with the numeral 6 analyzed in FIGURE 3 will include a diode connected to the reset output terminal of the first, second, fourth and fifth stages of the shift register 84; the second, third, fourth, and sixth stages of the shift register 85; the first, third, fourth, fifth, and sixth stages of shift register 86; and, the first, second, third, fifth, and sixth stages of the shift register 87.

FIGURE 3 also shows an analysis of one form of the numeral 8. The darkened and blank circles representative of the stages of each shift register which have stored quantities therein is indicative of the arrangement for connecting diode inputs thereto of the AND circuit associated with that numeral and shown in FIGURES 2*a* and 2*b*. The AND circuit associated with that numeral has diodes connected to the set output terminals of the fourth stage of shift register 84; the first and sixth stages of shift register 85; the third stage of shift register 86; and the second and fifth stages of shift register 87. All the other stages of each of these shift registers are connected to diodes of an AND circuit via their reset output terminals.

For purposes of clarity in presentation, no attempt has been made to show the AND circuits output in decoding the other sequential combinations representing the numerals of the table set forth hereinabove. Inasmuch as such a showing would be merely repetitive of the principle described, the AND circuits associated with each of the versions of the of the numerals shown in the table would comprise a diode matrix. Each of these AND circuits, as shown with respect to numerals 6 and 8, would also have a diode input which is connected to be energized in accordance with the presence of sampling pulses for the purpose of reading out the numerals which have been scanned and identified by one of the AND circuits. The occurrence of the sampling pulse may be determined by the completion of a raster scan of the field of view or some other criteria as discussed hereinbelow in connection with FIGURE 4. If a character has been identified in the raster scanning of the field of view, this character would be recognized by one of the AND circuits such that the sampling pulse will energize the remaining input of one of the AND circuits and one of the outputs of the diode matrix of FIGURES 2*a* and 2*b* will be energized.

It will be clear to those skilled in the art that the specific AND circuit and diode matrix arrangement will vary with the chraacters being sensed or recognized. An analysis of the characters such as described herein above in connection with FIGURE 3 will have to be conducted on each of the characters to be identified and the varying physical appearance that each character might take. Plug-in shift register units and/or plug-in diode matrix units could be utilized to vary the functional capability of a character sensing and recognition system built according to the teachings of the present invention.

Once a field of view has been scanned and a character identified, the sampling pulse or sampling operation must be initiated. Within the teachings of the present invention, it may not be desirable to wait until the raster scan of the field of view has been completed. For example, FIGURE 4 shows one circuit which may be utilized if it is assumed that the content of the diode matrix of FIGURES 2*a* and 2*b* should be after at least one shape identifying element is detected and the raster then completes a scan line without obtaining any positive samples. Referring to FIGURE 4, there is shown an OR circuit 120 connected to receive an input when either a shape identifying element $I_L$, O or $I_R$ is sensed by the analysis circuit of FIGURE 1. The output signal from OR circuit 120 is then used to drive a trigger 121 to its set condition. This circuit has the purpose of implementing the assumption that any time any one of these shape identifying elements has been sensed, the analysis circuit is in the process of identifying a character.

The set output terminal of trigger 121 then provides an input signal to AND circuit 122 which has at least two other input terminals. Also providing an input to the circuit of FIGURE 4 is the output of signal control circuit 16 which generates a pulse every time a positive sample is obtained during the raster scan. This input terminal is connected to an AND circuit 123. AND circuit 123 is gated by another input which is intended to be receiving a signal only during a time period representative of a single scan line. Trigger 124 is connected to provide that input signal. Specifically, as shown, trigger 124 is connected to be driven to the set position by set output terminal of counter trigger 19 of FIGURE 1 in accordance with the occurrence of the positive going portion of waveform T3. Moreover, trigger 124 is driven to the reset condition near the end of each scan line by the outputs of counter triggers 17, 18 and 19 of FIGURE 1 when the waveform level of each is in its down condition. Accordingly, AND circuit 123 will be gated to pass a signal during each scan line. The output thereof will drive trigger 125 to a set condition during each scan line in which a positive sample is derived. Trigger 125 is reset at the end of each scan line by the same input which resets trigger 124. However, if during a given scan line a positive sample is never received, trigger 125 is never placed in its set condition. Accordingly, AND circuit 122 which is connected to the reset output terminal of trigger 125 receives an input signal at each of its input terminals during the entire scan line. Thus wherever a character I is in the process of being sensed and a scan line takes place in which no positive sample is generated, AND circuit 122 provides readout control signal output R which can be applied to the sampling input of each of the AND circuits of the diode matrix of FIGURES 2*a* and 2*b*.

After a character has been sensed and identified by sampling the content of the diode matrix, it is necessary to reset the analysis circuitry including the shift registers 84, 85, 86 and 87. One way of providing this resetting action is to generate a reset signal which is present until the next raster scan of the field of view and a positive sample is obtained from the scanning equipment. This reset signal FR may then be applied via OR circuit 130 of FIGURE 1 to the shift inputs of each stage of each shift register providing that the reset signal lasts sufficiently long with respect to the transfer delay of each inverter delay $I_D$ placed between each stage of each shift register, all of the stages of all of the shift registers will be placed in a reset condition. As those skilled in the art will recognize, this is but one of the known methods for resetting the shift registers. The reset signal FR may also be applied to the counter triggers in the analysis circuit of FIGURE 1 associated with sensing shape identifying elements $I_L$ and $I_R$, as shown. The reset signal SR required in the analysis circuitry associated with sensing shape identifying elements H and O may be obtained from the outpoint of counter trigger 19 to correspond to the positive going portion of waveform T3.

In FIGURE 4, trigger 127 is shown functioning to provide the reset signal FR from its set output terminal. Accordingly, trigger 127 must be placed in a set condition at a time following the sampling pulse R being applied to the diode matrix of FIGURES 2*a* and 2*b* and reset at a time during the next raster scan when a positive sample S is obtained. The reset input terminal of trigger 127 is shown connected to the output of signal control circuit 16. OR circuit 139, trigger 140 and AND circuit 128 provide for the reset signal FR to be generated at the end of a scan of a field of view even though a character is not sensed.

In a practical application of the teachings of the present invention it would be important that the analysis circuit including the logic signal detecting means, the sequence registers and the diode decoding matrices not be in operation unless there is a character in the field of view to be scanned. Accordingly, FIGURE 5 shows a control circuit which would provide for turning off the analysis circuit until a character is present in the field of view. Therein, the output P of pulse amplifier 14 providing the flying spot scanner output signal is prevented from passing through a control AND circuit 100 until a positive sample is obtained in subsector B of any sweep. By inspection of the counter waveforms of FIGURE 1, subsector B is defined by a timing gate signal for triggers 17, 18 and 19 of T1, T2 and T3, respectively. When, during subsector B time of any raster scan line, a positive sample P is derived, a signal pulse passes through AND circuit 101 and in turn sets trigger 102 which causes the vertical sweep circuit of the raster scan shown in block 20 of FIGURE 1 to restart in a conventional manner. When the vertical sweep circuit is restarted, the raster scan commences the raster of scan of the field of view from the point of beginning. When, on the completion of a complete raster scan of the field of view, a character is read from the decoding matrix of FIGURES 2*a* and 2*b*, OR circuit 104 provides an input to trigger 102 via OR circuit 105 to reset trigger 102 stopping the operation of the analysis circuit which requires that AND circuit 100 be open. If, after a complete raster scan of the field of view, no character is read from the decoding matrix so as to provide an input to OR circuit 104, the vertical sweep control generates a pulse FR which is applied to a two-state "count of four" counter to comprise counter triggers 107 and 108. Accordingly, if even though sub-sector B of the field of view provides a positive sample which energizes the analysis circuit for complete scans have been made of the field of view an output pulse is applied through OR circuit 25 to reset control trigger 102.

It should be understood that the design details of a practical application to the teachings of the present invention would require many circuits not shown. These details are not set forth herein as they would merely add a complication to the description that is not necessary to understand the present invention. Moreover, the detailed circuitry such as that shown in the collateral circuits exemplified by FIGURES 4 and 5, etc. may vary from one practical application to another as required. A clear presentation of the teachings of the present invention was intended in the limitation of the discussion of the example of a particular form of the numerals 6 and 8 inasmuch as the applications thereof to other numerals of other formats is a matter of mere detailed consideration.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A character recognition system comprising a raster type scanning device for scanning a field of view containing a character to be identified, said character to be identified in terms of plural recognition elements defined by sequential combinations of pulses generated by said raster scanning device in accordance with the character to be identified and the sequence in which said plural recognition elements are detected, plural recognition logic circuit means equal in number to said different plural recognition elements each having plural signal pulse input terminals and timing pulse input terminals and one recognition output terminal, plural time gate generator means for generating timing pulses, the timing gate generating means being connected to said raster type scanning device and operating in controlled synchronism with said raster scanning device, said plural recognition logic circuit means each being connected through said input terminals to receive input pulses from said raster type scanning device and said pulse timing gate generator to provide at said output terminal an electrical signal, said output terminal of each recognition logic circuit means receiving an output signal in accordance with the character being identified and in time sequence with output signals appearing at the other output terminals as determined by the character being identified, plural shift registers equal in number to said plural recognition logic circuit means each having a number of stages to accommodate the sequentially detected recognition elements in a character, each of said shift registers being shifted each time an output signal appears at the output terminal of one of said recognition logic circuit means so that at the completion of a complete scan of a field of view the content of all of said registers being indicative of the character being identified.

2. A character recognition system comprising a raster type scanning device for scanning a field of view containing a character to be identified, said character to be identified in terms of plural recognition elements defined by sequential combinations of pulses generated by said raster scanning device in accordance with the characters to be identified and the sequence in which said plural recognition elements are detected, plural recognition logic circuit means equal in number to said different plural recognition elements each having plural signal pulse input terminals and timing pulse input terminals and one recognition output terminal, plural time gate generator means for generating timing pulses, the timing gate generating means being connected to said raster type scanning device and operating in controlled synchronism with said raster scanning device, said plural recognition logic circuit means each being connected through said input terminals to receive input pulses from said raster type scanning device and said pulse timing gate generator to provide at said output terminal an electrical signal, said output terminal of each recognition logic circuit means receiving an output signal in accordance with the character being identified and in time sequence with output signals appearing at the other output terminals as determined by the character being identified, plural shift registers equal in number to said plural recognition logic circuit means each having a number of stages to accommodate the sequentially detected recognition elements in a character, each of said shift registers being shifted each time an output signal appears at the output terminal of one of said recognition logic circuit means so that at the completion of a complete scan of a field of view the content of all of said registers being indicative of the character being identified, means interposed between the output terminal of each of said recognition logic circuit means and its corresponding output shift register input to prevent an electrical pulse being generated representing a particular recognition element in a successively repetitive manner during a complete scan.

3. A character recognition system comprising a raster type scanning device for scanning a field of view containing a character to be identified, said character to be identified in terms of plural recognition elements defined by sequential combinations of pulses generated by said raster scanning device in accordance with the character to be identified and the sequence in which said plural recognition elements are detected, plural recognition logic circuit means equal in number to said different plural recognition elements each having plural signal pulse input terminals and timing pulse input terminals and one recognition output terminal, plural time gate generator means for generating timing pulses, the timing gate generating means being connected to said raster type scanning device and operating in controlled synchronism with said raster scanning device, said plural recognition logic circuit means each being connected through said input terminals to receive input pulses from said raster type scanning device and said pulse timing gate generator to provide at said output terminal an electrical signal, said output terminal of each recognition logic circuit means receiving an output signal in accordance with the character being identified and in time sequence with output signals appearing at the other output terminals as determined by the character being identified, plural shift registers equal in number to said plural recognition logic circuit means each having a number of stages to accommodate the sequentially detected recognition elements in a character, each of said shift registers being shifted each time an output signal appears at the output terminal of one of said recognition logic circuit means so that at the completion of a complete scan of a field of view the content of all of said registers being indicative of the character being identified, a diode decoding matrix responsive to each stage of each of said shift registers for providing an electrical output signal when a character in said field of view is identified.

4. A character recognition system comprising an optical raster type scanning device for scanning a field of view containing a character to be identified, said raster type scanning device generating sequential combinations of pulses which define a plurality of shape identifying elements in accordance with the character to be identified; plural timing gate generating means for generating timing pulses, the timing gate generating means being connected to said raster type scanning device and operating in controlled synchronism with said raster type scanning device; computer logic circuit means having plural output terminals equal in number to the total number of shape identifying elements, said computer logic circuit means having timing pulse input terminals connected to said plural timing gate generating means and a signal input terminal connected to the raster type scanning device, said computer logic circuit means providing selective output signals at said plural output terminals in a particular time sequence in accordance with the characters being identified, said computer logic circuit means comprising first recognition circuit means for recognizing the presence of horizontal lines in the character to be identified, second recognition circuit means for recognizing vertical lines in the character to be identified, said second recognition circuit means including counter means for recognizing preceding and succeeding vertical lines in the character to be identified and third recognition circuit means for recognizing the presence of a white space between two vertical line segments in the character to be identified during a horizontal scan; character identification means connected to said plural output terminals for defining the character to be identified in terms of the selective output signals and the sequence at which they appear at said output terminals.

5. The character recognition system as set forth in claim 4 wherein the field of view is divided into a plurality of horizontal sectors, the number of said horizontal sectors being equal to the possible number of vertical lines desired to be capable of being sensed during a horizontal scan of said raster type scanning device; said plural timing gate generating means providing a discrete output pulse at the output of said plural timing gate generating means whenever said raster type scanning device scans a different horizontal sector during the horizontal scan of said raster type scanning device; said second recognition circuit means comprising a plurality of counter means equal to the number of horizontal sectors each having input terminals connected to said raster type scanning device and a timing input connected to said plural timing gate generating means so that each counter means is activated successively and exclusive of each other, there being a different counter activated for each horizontal sector scanned by said raster type scanning device during a horizontal scan, each of said counter means having a plurality of counter stages, each of said counter means advancing when said raster type scanning device detects the presence of a character segment in the field of view in the horizontal sector in which said counter means is activated, each of said counter means resetting when said raster type scanning device detects the absence of a character segment in the field of view in the horizontal sector in which said counter means is activated so that the last counter stage becomes activated when a character segment is detected in the same horizontal sector a number of successive times equal to the number of counter stages of each of said counter means, the last stage of each of said counter means being connected to said plural output terminals of said computer logic circuit means.

6. The character recognition system as set forth in claim 4 wherein blocking means are interposed between the output terminal of each of said computer logic circuit means and the input of the character identification means to prevent an electrical pulse being generated representing a particular recognition element in the successively repetitive manner during a complete scan, there being N said computer logic circuit means; said blocking means comprising N trigger circuits, individual ones of said trigger circuits connected to individual ones of said output terminals of said computer logic circuit means, N OR circuits each having an output terminal, each of said OR circuits having N−1 input terminals each connected to a different output terminal of said computer logic circuit means, all OR circuits being connected so that each output terminal of said computer logic circuit means is connected to N−1 OR circuits, a plurality of N AND circuits, each of said AND circuits having two input terminals, individual ones of said AND circuits being connected to individual ones of said trigger circuits through one input of each AND circuit, individual ones of said AND circuits being connected to the output of individual ones of said OR circuits through the second input of each of said AND circuits so that the OR circuit connected to a given AND circuit will have an input terminal connected to all output terminals of said computer logic circuit means except the output terminal of said computer logic circuit means that is connected to the trigger circuit that is connected to the given AND circuit.

References Cited by the Examiner

UNITED STATES PATENTS 2,889,535 6/1959 Rochester et al. ---- 340—146.3

DARYL W. COOK, *Acting Primary Examiner.*

MALCOLM A. MORRISON, *Examiner.*

J. S. IANDIORIO, J. E. SMITH, *Assistant Examiners.*